April 14, 1931. H. C. READING 1,801,176
FRAME AND SPRING SUSPENSION OF VEHICLES
Filed Aug. 15, 1929 3 Sheets-Sheet 1

April 14, 1931. H. C. READING 1,801,176

FRAME AND SPRING SUSPENSION OF VEHICLES

Filed Aug. 15, 1929 3 Sheets-Sheet 2

INVENTOR
Harold C. Reading
William C. Linton
ATTORNEY

Patented Apr. 14, 1931

1,801,176

UNITED STATES PATENT OFFICE

HAROLD CORNELIUS READING, OF LONDON, ENGLAND

FRAME AND SPRING SUSPENSION OF VEHICLES

Application filed August 15, 1929, Serial No. 385,994, and in Great Britain September 10, 1928.

This invention relates to frames and spring suspension of motor road vehicles and to trailers, and to vehicles of the kind in which the front axle is connected to the rear axle by a pair of longitudinal members disposed one at either side of the longitudinal axis of the chassis frame and fulcrumed on said frame substantially at the transverse axis thereof.

The object of the invention is to provide an improved construction of the above mentioned type of vehicle.

In a road vehicle constructed in accordance with this invention the front wheel-supporting means is connected to the rear wheel-supporting means by a pair of longitudinal members disposed one at either side of the longitudinal axis of the chassis frame and fulcrumed on said frame substantially at the transverse axis thereof, and further, the wheel-supporting means is each connected to a member or members arranged at right angles to the said longitudinal axis and fulcrumed at a point substantially along said longitudinal axis.

Either or both axles or bogeys of a motor road vehicle may be driven and the vehicle may be steered from either or both ends.

Figure 1:
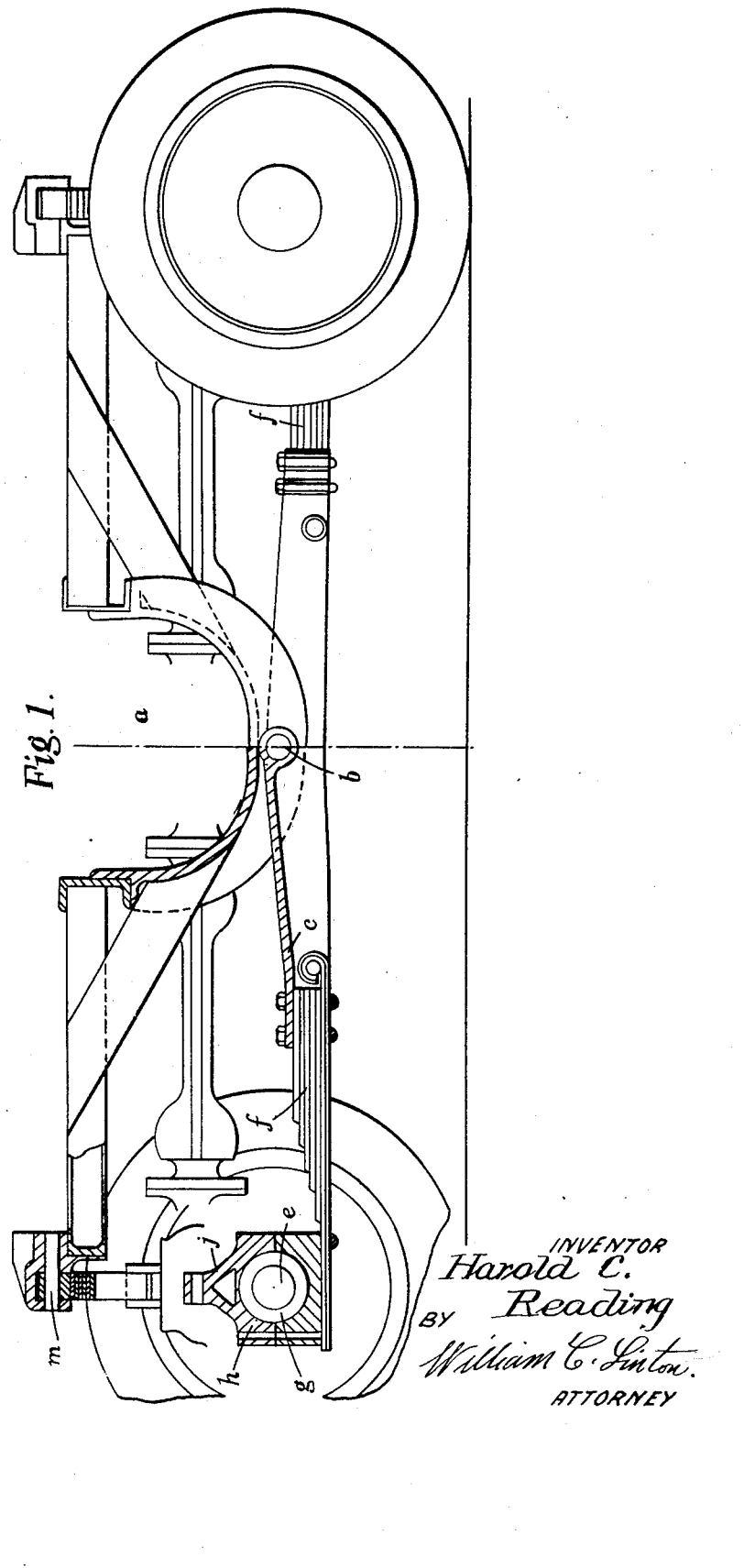
Figure 2:
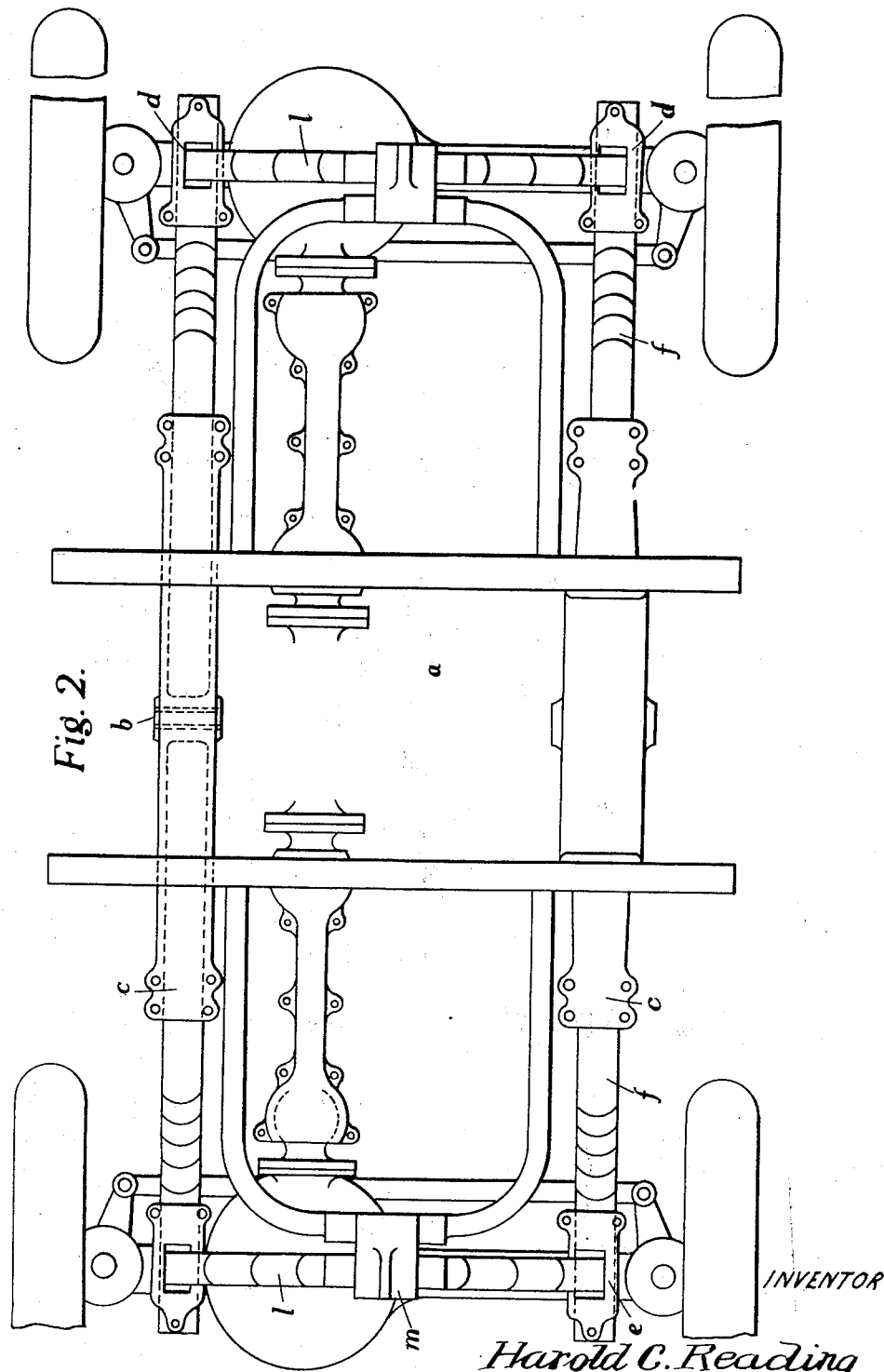
Figure 3:
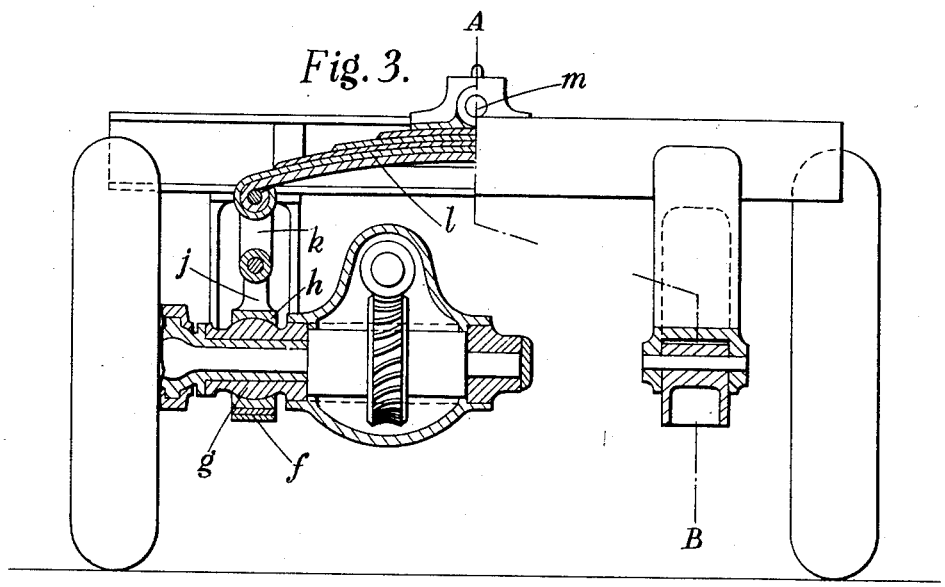

The invention will now be described with reference to the accompanying drawings in which Figure 1 is a side elevation partly in section of one form of the invention applied to the chassis of a 4-wheeled tractor; Figure 2 is a plan view, and Figure 3 is a front elevation, partly in section.

The power unit (not shewn) is mounted on the chassis frame at $a$ and both front and rear axles are driven from the said power unit in any suitable manner.

Secured to each side of the chassis frame and at either side of the longitudinal axis thereof and below the power unit, is a pin $b$, arranged horizontally and about which the spring member $c$ is adapted to fulcrum.

Each spring member $c$ is adapted to fulcrum at its mid-point and its extremities are secured to the front and rear wheel axles $d$, $e$, respectively.

The said members consist of a beam $c$ having laminated springs $f, f$ secured at each end thereof.

The front and rear wheel axles $d$, $e$ are each formed with a spherical boss $g$, one at either side of the longitudinal axis, and around each boss is provided a housings $h$. Secured to the underside of said housings $h$ are the extremities of the springs $f, f$.

The top of the said housings are formed with an upright bracket $j$ having a shackle $k$ attached thereto.

Bridging the two housings on each axle and connected to the said shackles $k$, $k$ are spring members $l$, $l$ each constituted by a series of laminated springs. Each of said spring members $l$, $l$ fulcrum about a horizontal pivot $m$ on the chassis frame and positioned along the longitudinal axis thereof.

In the case of a vehicle having one or more bogies, the longitudinal and transverse spring members may be connected to the bogey frame or frames at points on the longitudinal and transverse axes respectively.

What I claim is:—

1. In a vehicle, a frame front and rear wheel supporting means, a pair of longitudinal spring members fulcrumed on the vehicle frame and having their extremities connected to the front and rear wheel supporting means, and end spring members mounted pivotally with relation to said vehicle frame and disposed substantially in the same vertical plane with said wheel supporting means and directly connected to the latter.

2. In a vehicle, a frame front and rear wheel supporting means, a pair of longitudinal spring members disposed one at either side of the longitudinal axis of the vehicle frame and fulcrumed on said frame substantially at the transverse axis thereof, said pair of longitudinal members having their extremities connected to the front and rear wheel supporting means, and end spring members arranged at right angles to said longitudinal axis and fulcrumed at a point substantially along said longitudinal axis, said end spring members being disposed substantially in the same vertical plane with the wheel supporting means and directly connected to the latter.

3. In a vehicle, a frame front and rear wheel supporting means, a pair of longitudinal spring members disposed one at either side of the longitudinal axis of the vehicle frame and fulcrumed on said frame substantially at the transverse axis thereof, said pair of longitudinal members having their extremities connected to the front and rear wheel supporting means, and end spring members arranged at right angles to said longitudinal axis and disposed substantially in the same vertical plane with the wheel supporting means, said end members having their intermediate portions fulcrumed to said frame at a point substantially along the longitudinal axis thereof, and their extremities directly connected to said wheel supporting means.

4. In a vehicle, a frame front and rear wheel supporting means, a pair of longitudinal spring members disposed one at either side of the longitudinal axis of the vehicle frame and fulcrumed on said frame substantially at the transversal axis thereof, said pair of longitudinal members having their extremities connected to the front and rear wheel supporting means, pivotally mounted end spring members arranged at right angles to said longitudinal axis and disposed substantially in the same vertical plane with said wheel supporting means, and connecting means securing said end spring members directly to the wheel supporting means.

In testimony whereof he affixes his signature.

HAROLD CORNELIUS READING.